United States Patent
Byoen et al.

(10) Patent No.: US 9,659,718 B2
(45) Date of Patent: May 23, 2017

(54) HIGH LOAD SWITCH FOR VEHICLE

(71) Applicant: DAE DONG CO., LTD., Ansan-si, Gyeonggi-do (KR)

(72) Inventors: Dong Pil Byoen, Ansan-si (KR); Ki Won Seo, Seoul (KR)

(73) Assignee: DAE DONG CO., LTD., Ansan-Si (KR)

( * ) Notice: Subject to any disclaimer, the term of this patent is extended or adjusted under 35 U.S.C. 154(b) by 0 days.

(21) Appl. No.: 14/438,463

(22) PCT Filed: Oct. 31, 2013

(86) PCT No.: PCT/KR2013/009766
§ 371 (c)(1),
(2) Date: Apr. 24, 2015

(87) PCT Pub. No.: WO2014/069907
PCT Pub. Date: May 8, 2014

(65) Prior Publication Data
US 2015/0303004 A1 Oct. 22, 2015

(30) Foreign Application Priority Data

Nov. 5, 2012 (KR) .................. 10-2012-0124325
Sep. 27, 2013 (KR) .................. 10-2013-0115448

(51) Int. Cl.
*H01H 1/00* (2006.01)
*H01H 9/00* (2006.01)
(Continued)

(52) U.S. Cl.
CPC ............. *H01H 1/12* (2013.01); *B60R 16/02* (2013.01); *H01H 1/26* (2013.01); *H01H 3/42* (2013.01);
(Continued)

(58) Field of Classification Search
CPC ............. H01H 23/00; H01H 2021/00; H01H 2036/00; H01H 2036/0086;
(Continued)

(56) References Cited

U.S. PATENT DOCUMENTS 3,319,021 A    5/1967  Good
3,403,294 A *  9/1968  Suberg .................. B60Q 1/387
                                                      315/201

(Continued)

FOREIGN PATENT DOCUMENTS

CN        1745444 A    3/2006
DE     40 12 547 A1   10/1990
(Continued)

*Primary Examiner* — Anthony R. Jimenez
(74) *Attorney, Agent, or Firm* — Birch, Stewart, Kolasch & Birch, LLP

(57) ABSTRACT

A high load switch for a vehicle includes a case having an opening formed at an upper side of the case; a first contact unit disposed at a lower side in the case; a second contact unit disposed at a lower side in the case and disposed directly above the first contact unit; and a contactor having one end fixed to one side in the case, and the other end disposed between the first contact unit and the second contact unit, in which a portion of the contactor between the one end and the other end is continuously formed, and the contactor includes a pusher unit formed by being bent upward so that an intermediate portion thereof penetrates the opening and protrudes, and a reinforcement bead formed on a surface of the contactor, thereby preventing deformation in the contactor and enhancing durability.

15 Claims, 10 Drawing Sheets

(51) Int. Cl.

| | |
|---|---|
| *H01H 1/12* | (2006.01) |
| *H01H 1/26* | (2006.01) |
| *H01H 3/42* | (2006.01) |
| *H01H 21/22* | (2006.01) |
| *H01H 15/04* | (2006.01) |
| *B60R 16/02* | (2006.01) |

(52) U.S. Cl.
CPC ............ *H01H 15/04* (2013.01); *H01H 21/22* (2013.01); *H01H 2021/225* (2013.01)

(58) Field of Classification Search
CPC ....... H01H 2036/0093; H01H 2205/00; H01H 2205/004; H01H 2205/01; H01H 2205/016; H01H 2221/04; H01H 2237/004; H01H 3/00; H01H 3/02; H01H 3/04; H01H 3/12; H01H 5/02; H01H 9/02; H01H 13/00; H01H 13/04; H01H 13/10; H01H 13/14; H01H 13/20; H01H 13/50; H01H 13/70; H01H 13/86; H01H 21/04; H01H 21/36; H01H 21/54; H01H 2013/00; H01H 2013/50; H01H 2215/042; H01H 2215/05; H01H 2215/052; H01H 1/00; H01H 1/12; H01H 1/22; H01H 1/56; H01H 5/00; H01H 5/18; H01H 5/20; H01H 9/00; H01H 9/0027; H01H 13/02; H01H 13/12; H01H 13/36; H01H 2003/00; H01H 13/32; H01H 2201/00; H01H 2203/00; H01H 2203/002; H01H 2205/002; H01H 2221/00; H01H 2231/026; H01H 2237/00; H01H 21/28; H01H 1/025; H01H 1/0237; H01H 1/04; H01H 1/023; H01H 1/027; H01H 1/02376; C22C 5/06; C22C 1/10

See application file for complete search history.

(56) References Cited

U.S. PATENT DOCUMENTS

| | | | |
|---|---|---|---|
| 4,517,541 A * | 5/1985 | Ubukata | H01H 37/5418 |
| | | | 337/343 |
| 5,082,997 A | 1/1992 | Vialy | |
| 5,089,715 A | 2/1992 | Kokubu | |
| 6,246,020 B1 | 6/2001 | Sato | |
| 7,307,229 B2 * | 12/2007 | Bonn | H01H 1/18 |
| | | | 200/253 |
| 2001/0054546 A1 | 12/2001 | Oberndorfer | |
| 2004/0154907 A1* | 8/2004 | Blossfeld | H01H 1/5805 |
| | | | 200/11 R |
| 2006/0118399 A1* | 6/2006 | Schober | H01H 3/001 |
| | | | 200/402 |
| 2012/0193196 A1 | 8/2012 | Lin et al. | |
| 2013/0126321 A1* | 5/2013 | Suo | H01H 13/186 |
| | | | 200/335 |

FOREIGN PATENT DOCUMENTS

| | | |
|---|---|---|
| DE | 93 20 696.8 U1 | 1/1995 |
| FR | 2 597 658 A1 | 10/1987 |
| JP | 62-180832 U | 11/1987 |
| JP | 4-92341 U | 8/1992 |
| JP | 11-73848 A | 3/1999 |
| JP | 2000-182456 A | 6/2000 |
| JP | 2003-69250 A | 3/2003 |
| JP | 2004-158241 | 6/2004 |
| JP | 2008-147127 A | 6/2008 |
| KR | 1999-0020662 U | 6/1999 |
| KR | 20-2008-0004953 U | 10/2008 |

* cited by examiner

HIGH LOAD SWITCH FOR VEHICLE

TECHNICAL FIELD

The present invention relates to a high load switch for a vehicle, and more particularly, to a high load switch for a vehicle, which is relatively easily manufactured, reduces manufacturing costs by reducing the number of components, prevents the occurrence of operational noise, prevents deformation by reinforcing rigidity, and enhances durability.

BACKGROUND ART

In general, various types of switch devices are disposed in a vehicle in order to operate main constituent elements of the vehicle using an electric current supplied from a power source (not illustrated).

FIG. 1A is an exploded perspective view illustrating an example of a high load switch for a vehicle according to the related art, and FIG. 1B is a cross-sectional view illustrating an operational process of a contactor of constituent elements in FIG. 1A.

In particular, a high load switch for a vehicle is used for a switch device to which a relatively high load is applied among the switch devices. As an example of the high load switch for a vehicle, there is a power window switch.

As illustrated in FIGS. 1A and 1B, the power window switch is a switch device in which a contactor 5 performs ON contact while coming into instantaneous contact with a first contact unit 10a when external force is provided by a user, in order to prevent the occurrence of a spark caused by a high load, and the contactor 5 performs OFF contact while being instantaneously spaced apart from the first contact unit 10a and then coming into instantaneous contact with a second contact unit 10b at the opposite side when the external force of the user is removed.

In more detail, when the user provides external force to the contactor 5 in order to open the window, an electrical signal caused by the ON contact for opening the window is generated at the moment when the contactor 5 comes into contact with the first contact unit 10a, and when the user removes the external force from the contactor 5 in order to stop the operation of opening the window, an electrical signal caused by the OFF contact for stopping the window is generated at the moment when the contactor 5 is spaced apart from the first contact unit 10a, and then instantaneously comes into contact with the second contact unit 10b. This contact method is called a so-called "opposing contact method".

As illustrated in FIGS. 1A and 1B, in the high load switch for a vehicle according to the related art, when the user transmits operating force and moves a pusher 15 upward and downward toward the inside and the outside of the case 20, the other end 5b of the contactor 5, which is disposed in the case 20 and is in contact with an end 15a of the pusher 15, is moved along a circular arc based on a fixed one end 5a of the contactor 5.

Meanwhile, the contactor 5 is formed integrally with an elastic portion having predetermined elastic force, and the elastic portion 25 provides predetermined elastic force to the contactor 5 when the other end 5b of the contactor 5 is moved along a circular arc based on the one end 5a, thereby allowing the contactor 5 to be instantaneously and elastically deformed in directions toward the first contact unit 10a and the second contact unit 10b. Here, the contactor 5 is formed to be rounded so that a shape of the contactor 5 may be instantaneously deformed by elastic force provided from the elastic portion 25.

Therefore, in a case in which operating force of the user, which exceeds resistance force of the elastic portion 25, is provided when the other end 5b of the contactor 5 is moved along a circular arc based on the one end 5a, the contactor 5 comes into instantaneous contact with the first contact unit 10a, and in a case in which external force of the user is removed, the contactor 5 comes into instantaneous contact with the second contact unit 10b again, which is the original position, by resistance force of the elastic portion 25.

However, the high load switch for a vehicle according to the related art, which is configured as described above, has problems in that the one end 5a of the contactor 5 and the elastic portion 25 need to be fixed to an installation unit 3 disposed in the case 20, as illustrated in FIG. 1, and the contactor 5 needs to be accurately manufactured in consideration of a dimension of the installation unit 3 in order to permit the deformation and the instantaneous contact of the contactor 5, which are described above. That is, if the contactor 5 does not match the dimension of the installation unit 3, there will be concern of the occurrence of a spark, which is a troublesome problem in the high load switch, due to a difference in elastic force.

In addition, in a case in which excessive external force is provided to the pusher 15 by the user, there is concern that the contactor 5 will be permanently deformed, quality of main functions will be adversely affected due to a change in dimension and assembly dispersion that occur during assembly, even if the contactor 5 is manufactured to have an accurate dimension.

In addition, the greatest problem is that because the contactor needs to come into instantaneous contact with the first contact unit 10a and the second contact unit 10b so as to serve as a high load switch for a vehicle, contact noise such as "crackling" is generated during the contact operation. The contact noise results in a problem that degrades quality of products for a consumer.

Since a high load is applied to the high load switch for a vehicle, there are problems in that components of the high load switch for a vehicle are deformed due to the high load, thereby degrading durability of the high load switch for a vehicle.

DISCLOSURE

Technical Problem

The present invention has been made in an effort to solve the above technical problems, and an object of the present invention is to provide a high load switch for a vehicle, which may prevent the occurrence of operational noise, may be easily manufactured as a product, may prevent the occurrence of a spark, and may reduce manufacturing costs of the products by reducing the number of components.

In addition, another object of the present invention is to provide a high load switch for a vehicle, which has enhanced durability by preventing deformation in the contactor.

Technical problems of the present invention are not limited to the aforementioned technical problems, and other technical problems, which are not mentioned above, may be clearly understood by those skilled in the art from the following descriptions.

Technical Solution

In order to achieve the above objects, a high load switch for a vehicle according to an exemplary embodiment of the present invention includes: a case; a first contact unit which is disposed at a lower side in the case; a second contact unit which is disposed directly above the first contact unit; and a contactor which has one end that is fixed to one side in the case so as to have a cantilevered beam shape, and the other end that is moved downward by external force provided by a user, comes into contact with the first contact unit, is moved upward by elastic force when the external force of the user is removed, and comes into contact with the second contact unit, in which a portion of the contactor between the one end and the other end is continuously formed, and the contactor has a pusher unit that is formed by being bent at an intermediate portion of the contactor and protrudes while penetrating an opening that is opened toward an upper side of the case.

Other detailed matters of the exemplary embodiments are included in the detailed description and the drawings.

Advantageous Effects

According to the high load switch for a vehicle of the present invention, there are one or more effects as follows.

First, it is possible to manufacture the horizontal contactor except for the pusher unit of the contactor, thereby easily manufacturing the contactor.

Second, a pusher unit, which is a separate structure, is not required unlike the related art, thereby reducing manufacturing costs by reducing the number of components.

Third, the occurrence of operational noise is prevented, thereby preventing quality for the user from deteriorating.

Fourth, it is possible to prevent the deformation in the contactor caused by strong or continuous external force of the user.

Fifth, the deformation in the contactor is prevented, thereby enhancing durability of the high load switch for a vehicle.

The effects of the present invention are not limited to the aforementioned effects, and other effects, which are not mentioned above, will be clearly understood by those skilled in the art from the claims.

BEST MODE

Figure 1A:
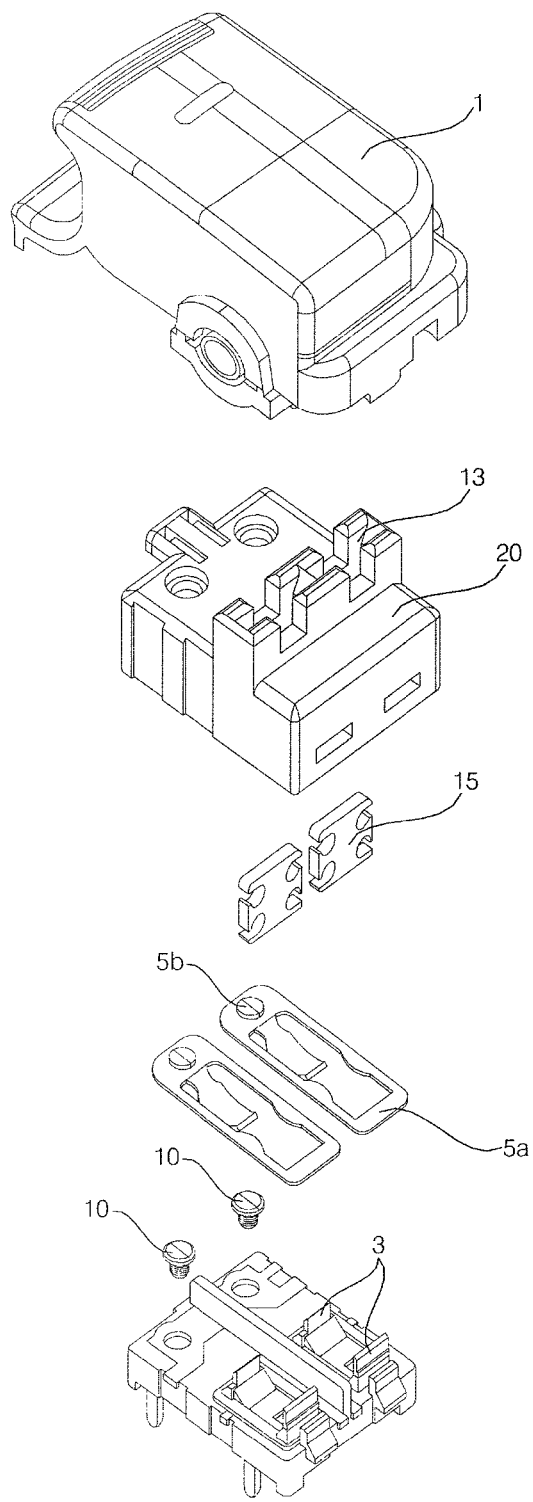
FIG. 1A is an exploded perspective view illustrating an example of a high load switch for a vehicle according to the related art.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Figure 2:
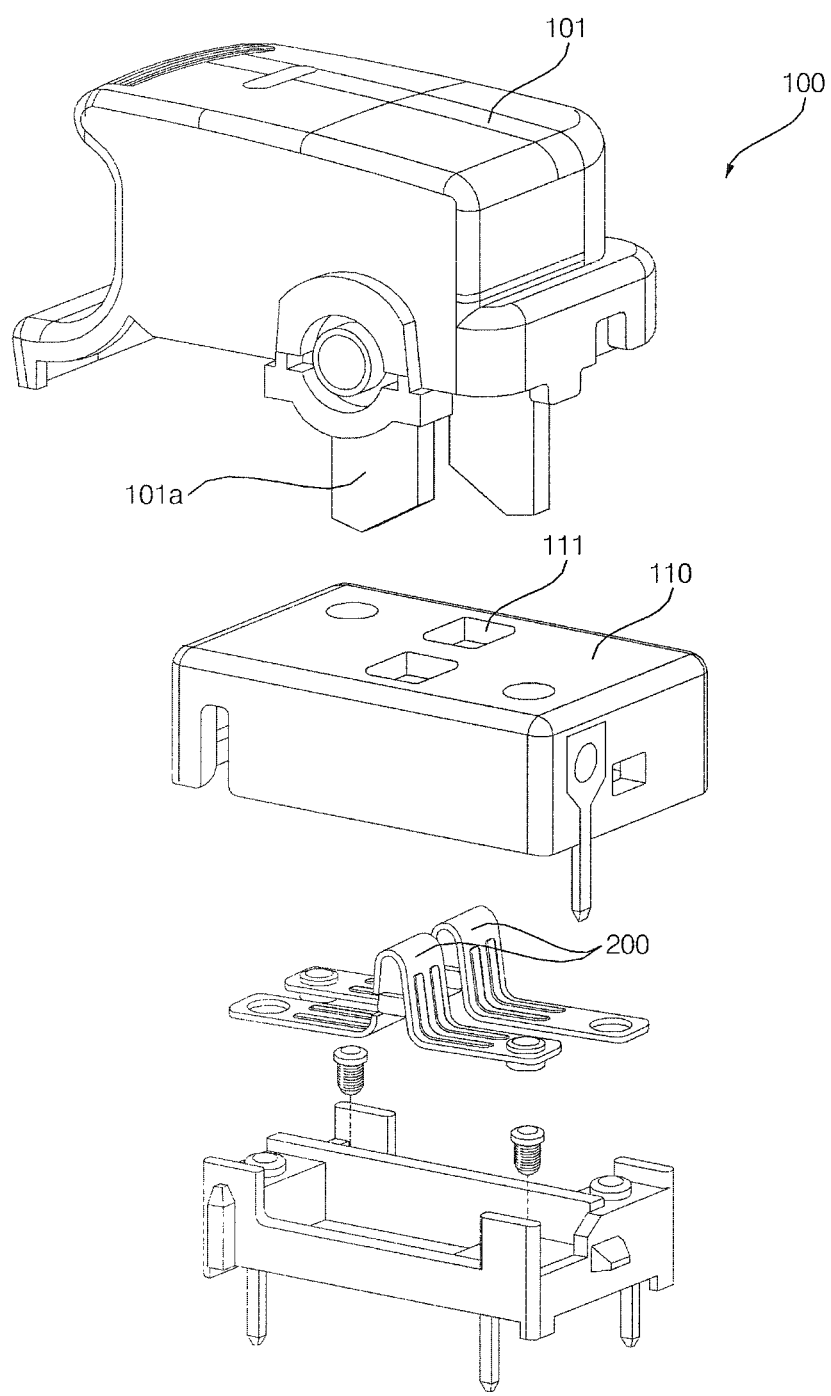
FIG. 2 is an exploded perspective view illustrating an exemplary embodiment of a high load switch for a vehicle according to the present invention.
Figure 3:
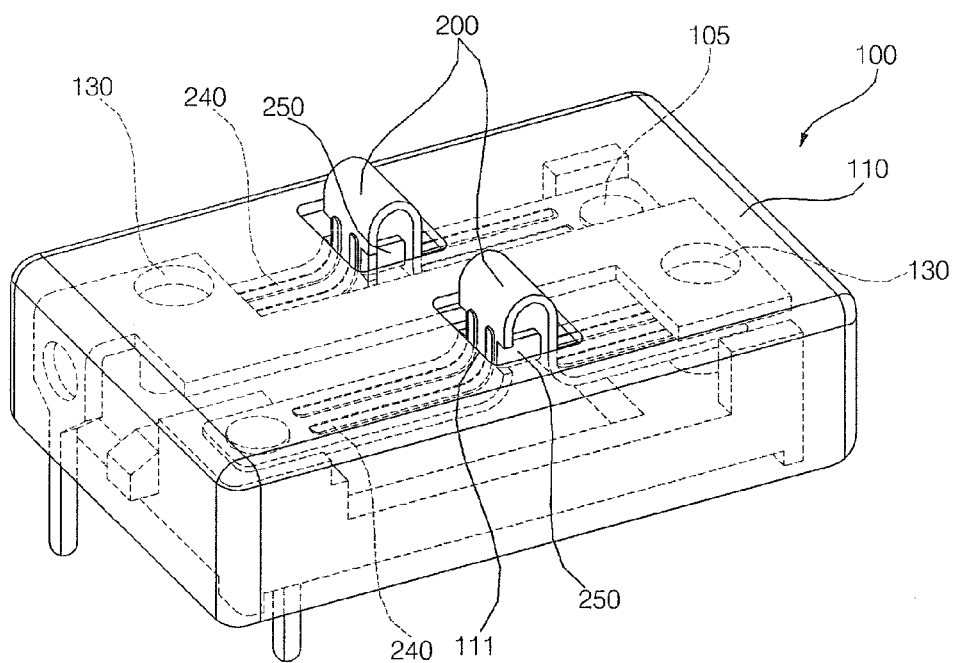
FIG. 3 is a perspective view illustrating the exemplary embodiment of the high load switch for a vehicle according to the present invention.
Figure 4:
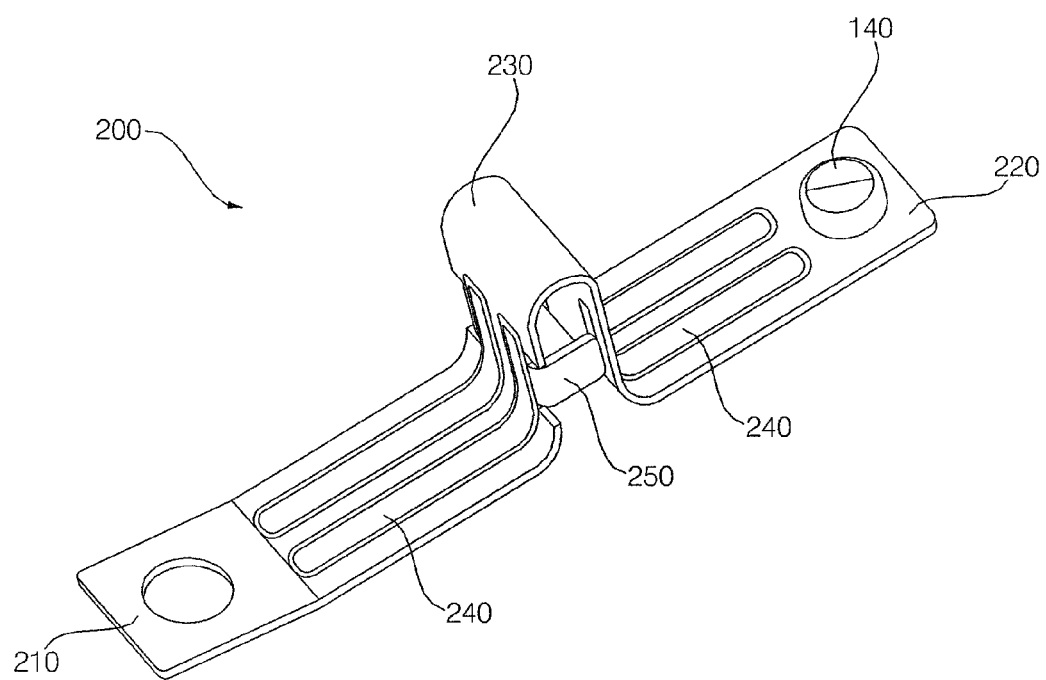
FIG. 4 is a perspective view illustrating a contactor of constituent elements in FIGS. 2 and 3.
Figure 5:
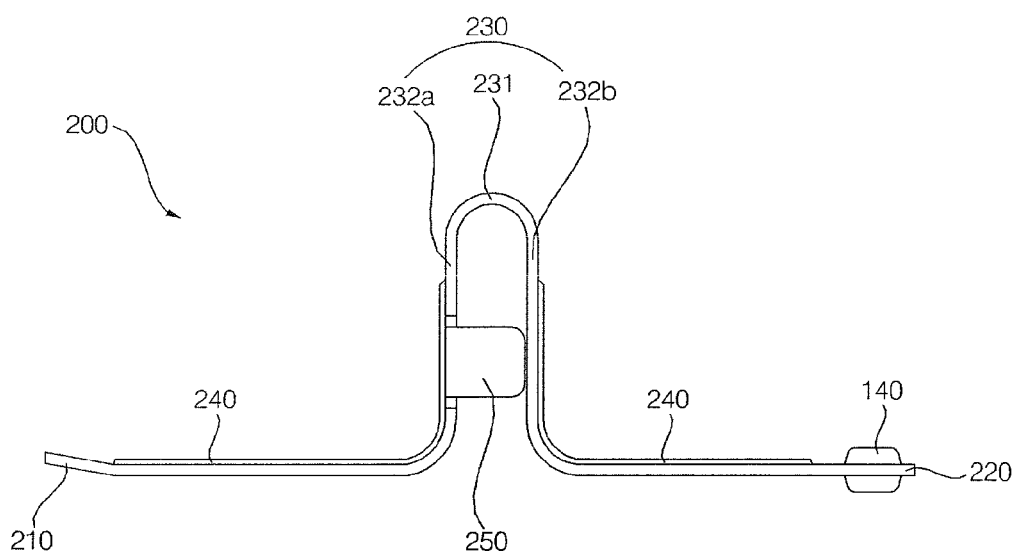
FIG. 5 is a side view of the contactor of the high load switch for a vehicle according to the exemplary embodiment of the present invention.
Figure 6A:
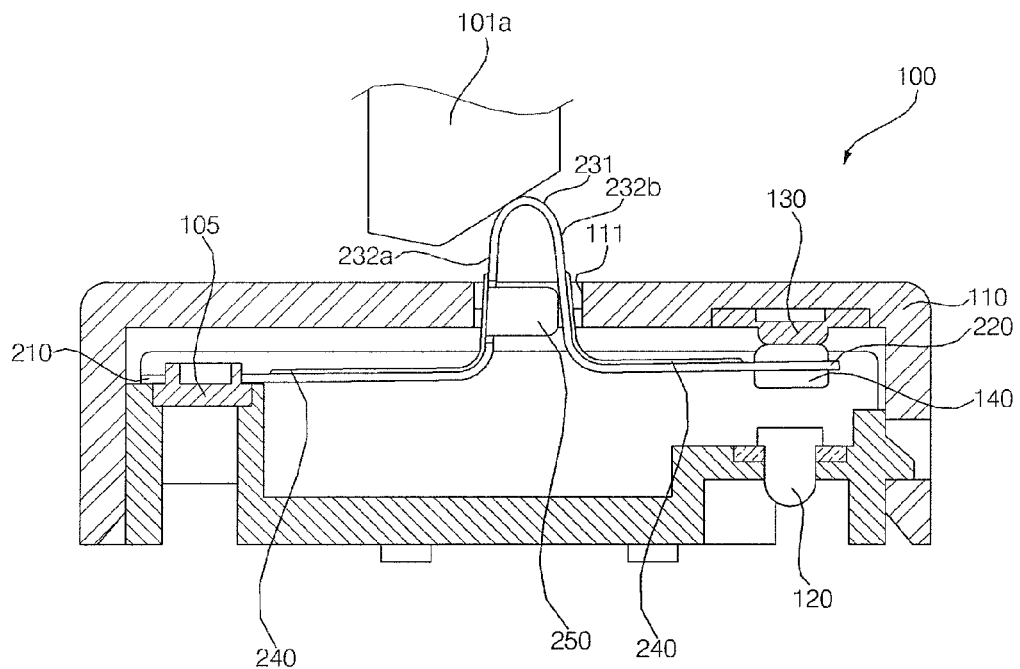
FIGS. 6A and 6B are views illustrating an operational process of the contactor of the high load switch for a vehicle according to the exemplary embodiment of the present invention.
Figure 6B:
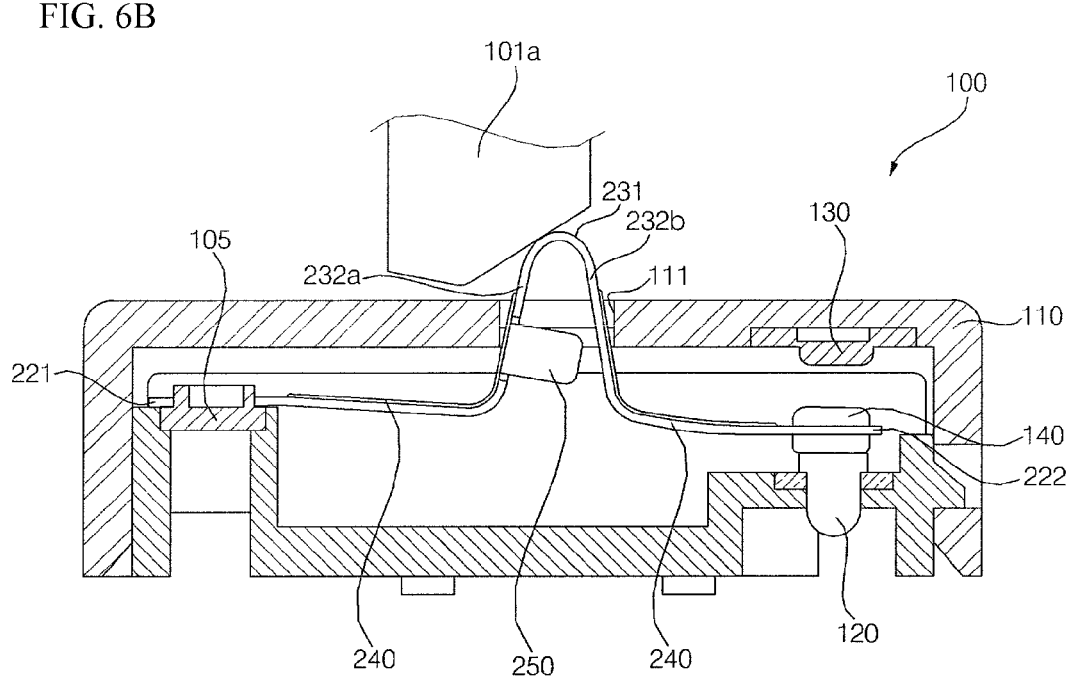
Figure 7A:
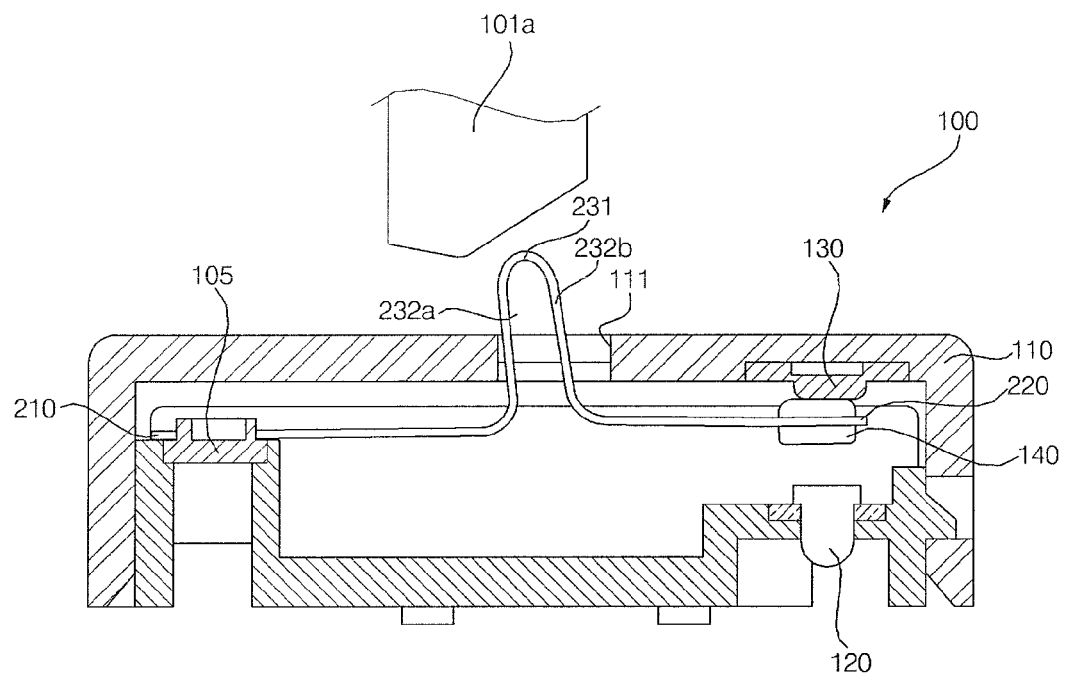
FIGS. 7A and 7B are views illustrating an operational process of the contactor of the high load switch for a vehicle in a case in which the contactor does not have a reinforcement bead and a bridge.
Figure 7B:
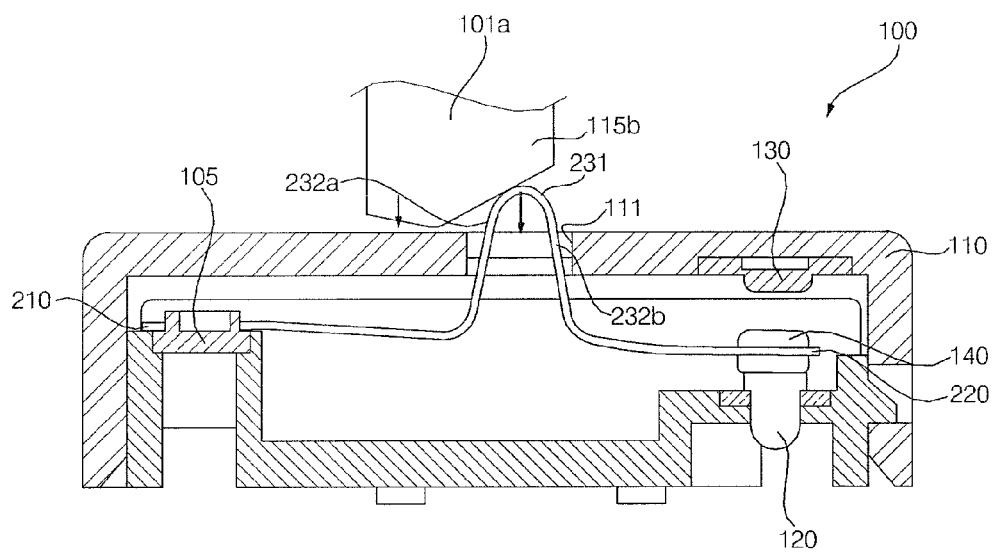

FIG. 2 is an exploded perspective view illustrating an exemplary embodiment of a high load switch for a vehicle according to the present invention, FIG. 3 is a perspective view illustrating the exemplary embodiment of the high load switch for a vehicle according to the present invention, FIG. 4 is a perspective view illustrating a contactor of constituent elements in FIGS. 2 and 3, FIG. 5 is a side view of the contactor of the high load switch for a vehicle according to the exemplary embodiment of the present invention, FIGS. 6A and 6B are views illustrating an operational process of the contactor of the high load switch for a vehicle according to the exemplary embodiment of the present invention, and FIGS. 7A and 7B are views illustrating an operational process of the contactor of the high load switch for a vehicle in a case in which the contactor does not have a reinforcement bead and a bridge.

Referring to FIGS. 2 and 3, a high load switch 100 for a vehicle according to an exemplary embodiment of the present invention includes a case 110 which has an opening 111 formed at an upper side of the case 110, a first contact unit 120 which is disposed at an inner lower side of the case 110, a second contact unit 130 which is disposed in the case 110 and disposed directly above the first contact unit 120, and a contactor 200 which has one end 210 fixed to one side in the case 110 and the other end 220 positioned between the first contact unit 120 and the second contact unit 130.

The opening 111 is formed to bring the inside and the outside of the case 110 into communication with each other, and formed at a center of an upper portion of the case 110. A lower end portion 101a of a knob 101 (see FIGS. 6A and 6B), which is operated by a user in a seesaw manner, is disposed above the opening 111. In addition, the plurality of openings 111 may be formed, and in the exemplary embodiment of the present invention, the two openings 111 may be formed at a center of the upper portion of the case 110 so as to be spaced apart from each other.

Here, a portion between the one end 210 and the other end 220 of the contactor 200 may be continuously formed, and the contactor 200 may include a pusher unit 230 that is formed by being bent upward so that a part of an intermediate portion thereof penetrates the opening 111 and protrudes to the outside of the case 110.

Hereinafter, for ease of description, among remaining portions of the contactor 200 except for the pusher unit 230, based on the pusher unit 230, a portion to which the contactor 200 is fixed is referred to as "one end 210", and a portion opposite to the one end 210 is referred to as "the other end 220".

The configuration of the contactor 200, which includes the one end 210, the pusher unit 230, and the other end 220, is just divided for convenience, and the contactor 200 is continuously and integrally formed using a single material.

As described above, the pusher unit 230 protrudes to the outside of the case 110 while penetrating the opening 111, and receives operating force from the user as the lower end portion 101a of the knob 101 comes into contact with the pusher unit 230.

Figure 1B:
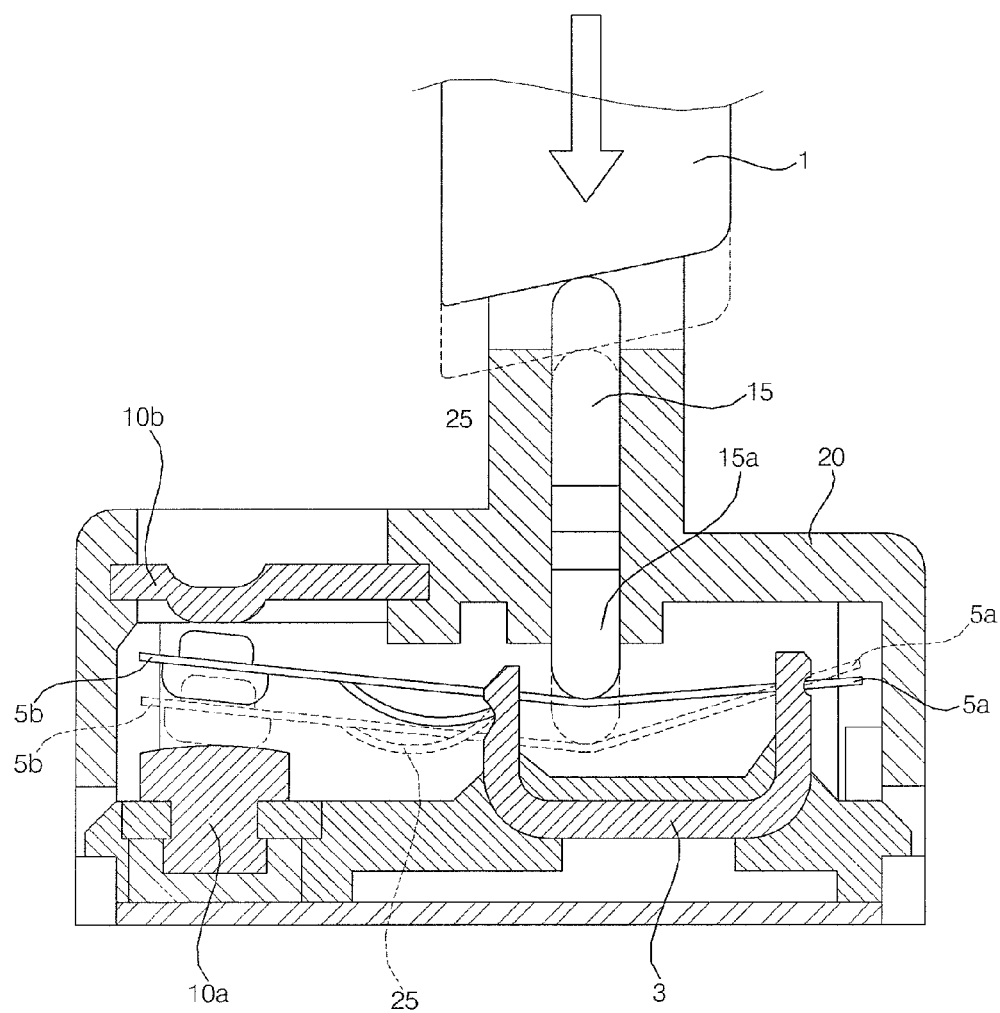
FIG. 1B is a cross-sectional view illustrating an operational process of a contactor of constituent elements in FIG. 1A.

The pusher unit 230 is formed continuously and integrally with other configurations (the one end 210 and the other end 220) of the contactor 200, and in the exemplary embodiment of the high load switch 100 for a vehicle according to the present invention, a separate external force transmission member (i.e., "pusher" indicated by reference numeral 15 in FIG. 1B in the related art) for providing external force from the user to the contactor 200 is not required, and as a result, advantages are obtained in that the number of components is reduced, and the number of assembly processes is also reduced during assembly.

The one end 210 of the contactor 200 is fixed to one side in the case 110 by a fixing member 105 so as to have a cantilevered beam shape. In addition, the other end 220 of the contactor 200 is disposed to be movable upward and downward between the first contact unit 120 and the second contact unit 130.

The other end 220 of the contactor 200 may have a protrusion 140 which protrudes upward and downward so that the other end 220 may easily come into contact with the first contact unit 120 and the second contact unit 130. However, the contactor 200 is installed so that the other end 220 of the contactor 200 is kept in continuous contact with the second contact unit 130 when the lower end portion 101a of the knob 101 is not in contact with the contactor 200, that is, when external force is not provided from the user.

As described above, the pusher unit 230 protrudes to the outside of the case 110 while penetrating the opening 111, and the lower end portion 101a of the knob 101 comes into contact with the pusher unit 230. Therefore, the pusher unit may receive operating force from the user who manipulates the knob 101.

Since the pusher unit 230 is formed integrally with the contactor 200, a separate structure for providing external force from the user is not required, thereby reducing the number of components, and also reducing the number of assembly processes.

The pusher unit 230 is approximately formed between the one end 210 and the other end 220 of the contactor 200. The pusher unit 230 includes a pair of vertical portions 231a and 231b which is disposed to have a predetermined width, and an extension portion 231 which extends from upper ends of the pair of vertical portions, and the pusher unit 230 is formed by being bent in a "U" shape that is opened at a lower side thereof.

The bent shape allows the shape of the contactor 200 to be easily deformed when external force is provided to the contactor 200, and allows the contactor 200 to have properties so that the contactor 200 is restored to the original shape by inherent elastic force of the contactor 200 after the shape of the contactor 200 is deformed.

In particular, the extension portion 231 is a portion with which the lower end portion 101a of the knob 101 comes into contact, and may be formed to be rounded so that the lower end portion 101a of the knob 101 may be smoothly moved downward. The pusher unit 230 may be formed so that a width, which corresponds to a separation distance between the vertical portions 232a and 232b, becomes gradually larger from the upper side to the lower side.

However, the width between the vertical portions 232a and 232b need not necessarily become gradually larger from the upper side to the lower side of the pusher unit 230, and a width between one vertical portion 232a and the other vertical portion 232b may be constant except for a width at connection portions between the vertical portions 232a and 232b and the extension portion 231 and a width at connection portions between each of the vertical portions 232a and 232b and each of the one end 210 and the other end 220.

In addition, a width of the intermediate portion of the pusher unit 230 may be larger than a width of the opening 111. Therefore, when external force is not provided to the contactor 200, the pusher unit 230 may be always in contact with the opening 111. However, the pusher unit 230 need not be necessarily and always in contact with the opening 111.

In the related art, the contactor in the related art needs to be brought into instantaneous contact with the first contact unit and the second contact unit when a high load is applied to the contactor, such that precision is required when manufacturing the shape of the contactor, but in the present invention, precision is not required when manufacturing the contactor 200 by virtue of the contactor 200 having the aforementioned shape, thereby easily manufacturing the contactor 200. In other words, in the case of the high load switch for a vehicle according to the exemplary embodiment of the present invention, dimension dispersion and assembly dispersion, which are required to assemble the contactor 200, are not greatly affected, thereby improving overall quality.

In addition, in the related art, when predetermined external force is provided or eliminated by the user, the contactor 200 comes into contact with the first contact unit 120 or the second contact unit 130 while the shape of the contactor 200 is instantaneously deformed, such that a loud contact noise occurs in this case, but in the present invention, the shape of the contactor 200 is not instantaneously deformed, but the contact process is normally carried out as gradual external force is provided, thereby preventing the occurrence of the contact noise.

In other words, in the case of the present invention, since the contactor 200 is integrated with the pusher 15 in the related art, the contact operation may be turned on and off at a low speed at which an actual operator manipulates the knob 101, and particularly, since the pusher unit 230 is formed in a "U" shape so as to have excellent elastic force, an effect of relieving impact is added during the contact operation, and as a result, there is an advantage in reducing operating noise.

The above configuration will be described in detail below with reference to the drawings (particularly, FIGS. 7A and 7B).

First, as illustrated in FIG. 7A, when the user manipulates the knob 101 and the lower end portion 101a of the knob 101 approaches one side of the pusher unit 230 and pushes the pusher unit 230 toward the other side, the other end 220 of the contactor 200 is moved to the first contact unit 120 from a state in which the other end 220 is in contact with the second contact unit 130, as illustrated in FIG. 7B.

Here, the state in which the other end 220 of the contactor 200 is in contact with the second contact unit 130 means, for example, a state in which a window for a vehicle, which is operated by a power window switch in the vehicle, is stopped. Although the window is in a stopped state, the window has been in an operational state in which the window is being opened or closed before the window is stopped, such that this state may be referred to as the OFF contact that means the stop of the operational state. On the contrary, the state in which the other end 220 of the contactor 200 is in contact with the first contact unit 120 means the operational state in which the window is being opened or closed, such that this state may be referred to as the ON contact that means the operation of the window. That is, in the case of the exemplary embodiment of the present invention, an opposing contact method, which brings the other end 220 of the contactor 200 into contact with the first contact unit 120 and the second contact unit 130, is applied.

Meanwhile, when external force is transmitted to the contactor 200 from the user through the lower end portion 101a of the knob 101, a contact state of the contactor 200 is changed from the OFF contact state in FIG. 7A to the ON contact state in FIG. 7B. In this case, before the lower end portion 101a of the knob 101 is completely rotated in a seesaw manner, the other end 220 of the contactor 200 is in contact with the first contact unit 120, and when the user continues to rotate the knob 101 thereafter and provides external force, the shape of the other end 220 of the contactor 200 is deformed in a state in which the other end 220 is in contact with the first contact unit 120. That is, when the user continues to rotate the knob 101 and provides external force in a state in which the other end 220 of the contactor 200 is in contact with the first contact unit 120, the other end 220 of the contactor 200 is spread outward at the pusher unit 230 having a "U" shape, such that the shape of the other end 220 is deformed while maintaining appropriate contact pressure.

In more detail, external force provided by the lower end portion 101a of the knob 101 is transmitted to the pusher unit 230, and the external force transmitted to the pusher unit 230 is transmitted to the other end 220 of the contactor 200, and in this case, when the other end 220 of the contactor 200 comes into contact with the first contact unit 120, the first contact unit 120 acts as resistance force against the external force that is continuously provided, and the external force provided by the user and the resistance force transmitted from the first contact unit 120 collide with each other, thereby deforming the shape of the contactor 200.

However, unlike the contactor in the related art, the shape deformation is not intended to bring the other end 220 of the contactor 200 into instantaneous contact with the first contact unit 120, but strictly speaking, the shape deformation is to allow the other end 220 of the contactor 200 to consistently receive external force from the user, maintain predetermined contact pressure with the first contact unit 120 by external force that is consistently provided, and thus prevent the other end 220 of the contactor 200 from arbitrarily deviating from the first contact unit 120. The function of preventing the arbitrary deviation may eventually lead to a function of preventing the occurrence of a spark that may become problematic in the high load switch 100.

In addition, since the shape of the contactor 200 is deformed after the other end 220 of the contactor 200 comes into contact with the first contact unit 120, contact noise is very low during the contact operation. Thus, emotional quality of the user is prevented from deteriorating due to the contact noise.

Meanwhile, it is possible to sufficiently expect that when external force is provided from the user, the external force brings the other end 220 of the contactor 200 into continuous contact with the first contact unit 120 while deforming the shape of the pusher unit 230 having a "U" shape so that the pusher unit 230 is gradually spread outward such that a horizontal separation distance of the pusher unit 230 becomes gradually greater when the shape of the contactor 200 is deformed. The reason is that in the high load switch 100 for a vehicle according to the present invention, the contactor 200 is originally manufactured so that the shape of the contactor 200 is easily deformed, and the pusher unit 230 is deformed eccentrically from one side of the pusher unit 230 against external force provided by the lower end portion 101a of the knob 101 so that the horizontal separation distance becomes gradually greater as described above.

On the contrary, when external force from the user is eliminated, in the order reverse to the order of movement from the second contact unit 130 to the first contact unit 120, the other end 220 of the contactor 200 is moved to the second contact unit 130 after coming into contact with the first contact unit 120, and then comes into contact with the second contact unit 130.

In this case, as illustrated in FIGS. 7A and 7B, since the external force provided by the user is eliminated until the lower end portion 101a of the knob 101 is spaced apart from the pusher unit 230, it is of course possible to sufficiently reduce contact noise associated with the second contact unit 130 as long as the other end 220 of the contactor 200 comes into contact with the second contact unit 130 at the moment when the lower end portion 101a of the knob 101 is spaced apart from the pusher unit 230.

Meanwhile, the contactor 200 may be formed so that the one end 210 and the other end 220 extend in a straight line except for the pusher unit 230 when external force is not provided from the user.

Accordingly, as a high load switch, the exemplary embodiment of the high load switch 100 for a vehicle according to the present invention prevents the occurrence of a spark, sufficiently reduces contact noise to prevent emotional quality of a consumer from deteriorating, improves productivity of products because it is not necessary to manufacture the high load switch with a precise dimension, and reduces the number of assembly processes and the like because a separate pusher is not required.

Meanwhile, the exemplary embodiment of the high load switch 100 for a vehicle according to the present invention may further include a reinforcement bead 240 which protrude on a surface of the contactor 200, and a bridge 250 which maintains a predetermined width between the pair of vertical portions 232a and 232b.

The bridge 250 is coupled to an inner surface of any one of the vertical portions 232a and 232b that constitute the pusher unit 230. The other end 220 of the contactor 200 needs to be provided to maintain predetermined contact pressure even when the other end 220 of the contactor 200 comes into contact with the second contact unit 130. However, the predetermined contact pressure, which is produced between the other end 220 of the contactor 200 and the second contact unit 130, reduces the separation distance between the pair of vertical portions 232a and 232b which corresponds to a lower side of the pusher unit 230, and in a case in which this phenomenon continues, the pair of vertical portions 232a and 232b may be permanently deformed in a state in which the separation distance between the pair of vertical portions 232a and 232b of the pusher unit 230 is narrowed. As the pair of vertical portions 232a and 232b is permanently deformed as described above, initial contact pressure, which is produced between the other end 220 of the contactor 200 and the second contact unit 130, is gradually decreased, and the decrease in contact pressure may cause a defect of a contact with the second contact unit 130 and affect durability of the contactor 200.

The bridge 250 serves to maintain the width, which corresponds to the separation distance between the pair of vertical portions 232a and 232b, to a predetermined width so that consistent contact pressure is maintained between the other end 220 of the contactor 200 and the second contact unit 130.

The reinforcement bead 240 is coupled to the surface of the contactor 200, and prevents the contactor 200 from being deformed, with high resistance against tension. The reinforcement beads 240 are formed between the one end 210 of the contactor 200 and the pusher unit 230 and between the other end 220 of the contactor 200 and the pusher unit 230. The reinforcement beads 240 may be provided on the surface of the contactor 200 in a plurality of rows.

In addition, the reinforcement bead 240 may extend up to the pusher unit 230. In the present exemplary embodiment, the reinforcement beads 240 may extend up to the vertical portions 232a and 232b of the pusher unit 230. In a case in which the reinforcement bead 240 has a long length as described above, the tension may be dispersed over a wider range, thereby effectively resisting the deformation of the contactor 200. An effect of force applied on the contactor 200 will be described below.

The reinforcement bead 240 is formed in a longitudinal direction of the contactor 200. The reinforcement bead 240 may be formed integrally with the contactor 200 by injection molding or the like. In addition, the reinforcement bead 240 protrudes on the surface of the contactor 200. As a protruding height of the reinforcement bead 240 becomes higher, it is possible to more effectively resist the deformation. However, the protruding height of the reinforcement bead 240 is excessively high, there is concern that assembly property and the like will deteriorate. Therefore, the reinforcement bead 240 may be formed to have an appropriate protruding height.

Regarding the reinforcement bead 240, when external force of the user is provided to the pusher unit 230 of the contactor 200, the other end 220 is moved downward by the external force. Therefore, the contactor 200 comes into contact with the first contact unit 120. Even after the contactor 200 is in contact with the first contact unit 120, tension is applied to the contactor 200 in a case in which external force is continuously applied. In addition, contact pressure, which is applied to the first contact unit 120, is increased by the external force applied to the contactor 200. Furthermore, the contactor 200 is curved or deformed by the tension. Therefore, the reinforcement bead 240 serves to withstand the tension applied to the contactor 200, thereby preventing the contactor 200 from being curved or deformed. That is, by preventing the contactor 200 from being deformed by the external force applied to the contactor 200, it is possible to constantly maintain contact pressure of the contactor 200, and enhance durability of the contactor 200.

The bridge 250 is coupled to an inner surface of any one of the vertical portions 231a and 231b of the pusher unit 230. In the present exemplary embodiment, the bridge 250 is coupled to the inner surface of the vertical portion 232a at the one end 210 side. As described above, the bridge 250 maintains the width between the vertical portions 232a and 232b of the pusher unit 230 to a predetermined width so that predetermined contact pressure is maintained between the other end 220 of the contactor 200 and the second contact unit 130 regardless of a period of use.

When external force of the user is provided to the pusher unit 230 of the contactor 200, the other end 220 is moved downward by the external force, and accordingly, the width between the vertical portions 232a and 232b of the contactor 200 is increased, such that the bridge 250 is spaced apart from the inner surface of the vertical portion 231b at the other end 220 side.

When describing the above configuration in more detail with reference to FIG. 5, the protrusion 140 formed at the other end 220 of the contactor 200 comes into contact with the first contact unit 120 when external force by the user is provided to the pusher unit 230. In this case, the shape of the contactor 200 is deformed so that the vertical portions 232a and 232b of the pusher unit 230, which has a "U"-shaped cross-sectional shape, are gradually spread outward.

In a case in which the pusher unit 230 is formed to have a "U"-shaped cross-sectional shape, there are the following advantages. First, the "U"-shaped cross section of the pusher unit 230 penetrates the opening 111 and protrudes to the outside of the case 110, such that it is not necessary to provide an external force transmission member such as a separate pusher (see the drawings in the related art), thereby reducing the number of components. However, even in the case of the present invention, it is not necessary to necessarily exclude the external force transmission member such as the pusher. Second, the "U"-shaped cross section of the pusher unit 230 may perform switching using smaller pushing force in comparison with a case in which the contactor 200 is simply formed in a "-" shape without having the pusher unit 230. That is, large pushing force is required in a case in which the contactor 200 has the "-" shape, but in the case of the pusher unit 230 having the "U"-shaped cross section, pushing force may be provided to only a portion where the shape of the pusher unit 230 begins to be deformed even in a case if smaller pushing force is used, thereby performing the switching using smaller pushing force.

Here, in a case in which the shape deformation of the contactor 200 does not exceed inherent elastic force that the contactor 200 originally has (i.e., the contactor 200 is not permanently deformed), the contactor 200 is restored to the original shape when external force is removed. The shape deformation of the contactor 200 may be adjusted by appropriately designing the lower end portion 101a of the knob 101 which provides external force to the contactor 200.

The bridge 250 serves to prevent the width of the vertical portions 232a and 232b from being decreased to a predetermined width or less so that predetermined contact pressure is maintained at the time of the OFF contact state in which the other end 220 of the contactor 200 comes into contact with the second contact unit 130, and to prevent a contact defect between the other end 220 of the contactor 200 and the second contact unit 130. Therefore, it is possible to prevent deformation in the contactor 200, and to enhance durability of the high load switch for a vehicle.

In the case of the present invention, since the contactor 200 is integrated with the pusher in the related art, the contact operation may be turned on and off at a low speed at which an operator actually manipulates the knob 101, and particularly, since the pusher unit 230 is formed in a "U" shape so as to perform the switching even by smaller pushing force and have excellent elastic force, an effect of relieving impact is added during the contact operation, and as a result, there is an advantage in reducing operating noise.

An operation of the high load switch for a vehicle according to the present invention, which is configured as described above, will be described below with reference to the accompanying drawings (particularly, FIGS. 6A to 7B).

First, an operation of the bridge 250 at the time of the OFF contact state will be described below.

As illustrated in FIG. 7A, in a case in which operating force is not absolutely provided by the user, that is, in a case in which the other end 220 of the contactor 200 comes into contact with the second contact unit 130, which is an off contact point, at predetermined contact pressure, a phenomenon in which a lower end portion of the pusher unit 230 is narrowed by consistent contact pressure may occur. The shape deformation in the pusher unit 230 is a desirable phenomenon as long as the shape deformation is not permanent deformation, but in a case in which the permanent deformation occurs due to the contact pressure, there is a problem in that relative deterioration in contact pressure occurs, which may lead to an operational defect of the high load switch for a vehicle according to the present invention.

Here, as illustrated in FIG. 6A, the bridge 250 is fixed to the inner surface of any one of the vertical portions 232a and 232b that constitute the pusher unit 230, and serves to prevent the separation distance between the pair of vertical portions 232a and 232b from being narrowed. As described above, the permanent deformation in the pusher unit 230 is prevented by the bridge 250 regardless of contact pressure between the other end 220 of the contactor 200 and the second contact unit 130, thereby improving durability of the high load switch for a vehicle according to the present invention.

Meanwhile, an operation of the pusher unit 230 at the time of the ON contact state will be described below.

As illustrated in FIG. 7B, when the user manipulates the knob 101, the lower end portion 101a of the knob 101 pushes the pusher unit 230, and the other end 220 of the contactor 200 is moved to the first contact unit 120, thereby performing the ON contact. In this case, since the pusher unit 230 is formed in a "U" shape, the shape of the pusher unit 230 is deformed so that the pusher unit 230 is easily spread out.

As described above, since the pusher unit 230 is provided to protrude from the interior to the outside of the case 110 through the opening 111 of the case 110, a separate external force transmission member is not required, and the shape of the pusher unit 230 is easily deformed and restored to the original shape by inherent elastic force, thereby implementing smooth opposing contact.

While the exemplary embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

The invention claimed is:

1. A high load switch for a vehicle, comprising:
a case;
a first contact unit which is disposed at a lower side in the case;
a second contact unit which is disposed directly above the first contact unit; and
a contactor which has one end that is fixed to one side in the case so as to have a cantilevered beam shape, and a other end that is moved downward by external force provided by a user, comes into contact with the first contact unit, is moved upward by elastic force when the external force by the user is removed, and comes into contact with the second contact unit,
wherein a portion of the contactor between the one end and the other end is continuously formed, and the contactor has a pusher unit that is formed by being bent at an intermediate portion of the contactor and protrudes while penetrating an opening that is opened toward an upper side of the case,
wherein a horizontal length of the intermediate portion, which is bent to form the pusher unit, is larger than that of the opening,
wherein the contactor further includes at least one reinforcement bead formed on a surface of the contactor, wherein the at least one reinforcement bead is a plurality of reinforcement beads formed on the surface of the contactor, and wherein the plurality of reinforcement beads are provided in a plurality of rows.

2. The high load switch of claim 1, wherein the pusher unit is formed by being bent in a "U" shape that is opened toward an inner lower side of the case.

3. The high load switch of claim 1, wherein the pusher unit is formed to be rounded.

4. The high load switch of claim 1, wherein a horizontal separation distance between vertical portions of the pusher unit is gradually decreased toward the upper side.

5. The high load switch of claim 1, wherein when external force is provided by the user and the other end of the contactor comes into contact with the first contact unit, the pusher unit brings the other end of the contactor into continuous contact with the first contact unit while a shape of the pusher unit is deformed so that a horizontal separation distance is gradually increased.

6. The high load switch of claim 1, wherein the contactor is formed so that when external force of the user is not provided, a portion between the one end and the other end extends in a straight line, except for the pusher unit.

7. The high load switch of claim 1, wherein the plurality of reinforcement beads are formed in a longitudinal direction of the contactor.

8. The high load switch of claim 1, wherein a portion of the contactor between the one end and the other end is continuously formed.

9. The high load switch of claim 1,
wherein the plurality of reinforcement beads are formed between the one end and the pusher unit and between the other end and the pusher unit.

10. The high load switch of claim 9, wherein the plurality of reinforcement beads extend up to the pusher unit.

11. The high load switch of claim 1, wherein the pusher unit includes a pair of vertical portions which is disposed to have a predetermined width, and an extension portion which extends from upper ends of the pair of vertical portions, and is formed in a "U" shape that is opened at a lower side thereof, and the contactor further includes a bridge that maintains a width between the pair of vertical portions.

12. The high load switch of claim 11, wherein the bridge is coupled to an inner surface of any one of the pair of vertical portions that constitutes the pusher unit.

13. The high load switch of claim 12, wherein the bridge is disposed to come into contact with an inner surface of any one of the pair of vertical portions.

14. A high load switch for a vehicle, comprising:
a case;
a first contact unit which is disposed at a lower side in the case;

a second contact unit which is disposed directly above the first contact unit; and a contactor which has one end that is fixed to one side in the case so as to have a cantilevered beam shape, and a other end that is moved downward by external force provided by a user, comes into contact with the first contact unit, is moved upward by elastic force when the external force by the user is removed, and comes into contact with the second contact unit, wherein a portion of the contactor between the one end and the other end is continuously formed, and the contactor has a pusher unit that is formed by being bent at an intermediate portion of the contactor and protrudes while penetrating an opening that is opened toward an upper side of the case, wherein the contactor further includes a reinforcement bead formed on a surface of the contactor, wherein the at least one reinforcement bead is a plurality of reinforcement beads formed on the surface of the contactor, and wherein the plurality of reinforcement beads are provided in a plurality of rows.

15. A high load switch for a vehicle, comprising:

a case;

a first contact unit which is disposed at a lower side in the case;

a second contact unit which is disposed directly above the first contact unit; and a contactor which has one end that is fixed to one side in the case so as to have a cantilevered beam shape, and a other end that is moved downward by external force provided by a user, comes into contact with the first contact unit, is moved upward by elastic force when the external force by the user is removed, and comes into contact with the second contact unit, wherein a portion of the contactor between the one end and the other end is continuously formed, and the contactor has a pusher unit that is formed by being bent at an intermediate portion of the contactor and protrudes while penetrating an opening that is opened toward an upper side of the case, wherein the pusher unit includes a pair of vertical portions which is disposed to have a predetermined width, and an extension portion which extends from upper ends of the pair of vertical portions, and is formed in a "U" shape that is opened at a lower side thereof, and the contactor further includes a bridge disposed on an inner surface of one of the vertical portions to maintain a width between the pair of vertical portions.

* * * * *